US009874973B2

(12) United States Patent
Shepelev

(10) Patent No.: US 9,874,973 B2
(45) Date of Patent: Jan. 23, 2018

(54) TECHNIQUES FOR REDUCING CROSS TALK FOR SIMULTANEOUS TOUCH SENSING AND DISPLAY UPDATING

(71) Applicant: Synaptics Incorporated, San Jose, CA (US)

(72) Inventor: Petr Shepelev, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 97 days.

(21) Appl. No.: 14/582,460

(22) Filed: Dec. 24, 2014

(65) Prior Publication Data
US 2016/0188107 A1 Jun. 30, 2016

(51) Int. Cl.
G06F 3/041 (2006.01)
G06F 3/044 (2006.01)
G09G 3/20 (2006.01)
G09G 5/12 (2006.01)

(52) U.S. Cl.
CPC .......... G06F 3/0418 (2013.01); G06F 3/044 (2013.01); G09G 3/20 (2013.01); G09G 5/12 (2013.01); G09G 2310/0202 (2013.01); G09G 2310/08 (2013.01)

(58) Field of Classification Search
USPC ............... 345/173–178; 178/18.01–20.01
See application file for complete search history.

(56) References Cited

U.S. PATENT DOCUMENTS

| 8,217,913 | B2 | 7/2012 | Hotelling et al. |
| 2008/0062148 | A1* | 3/2008 | Hotelling ............ G02F 1/13338 345/174 |
| 2010/0253638 | A1 | 10/2010 | Yousefpor et al. |
| 2011/0210939 | A1 | 9/2011 | Reynolds et al. |
| 2013/0057507 | A1 | 3/2013 | Shin et al. |
| 2013/0057511 | A1 | 3/2013 | Shepelev et al. |
| 2013/0057512 | A1 | 3/2013 | Lillie et al. |
| 2014/0132526 | A1* | 5/2014 | Lee ....................... G06F 3/0412 345/173 |
| 2014/0347297 | A1* | 11/2014 | Tsuji ..................... G06F 3/0412 345/173 |
| 2015/0346885 | A1* | 12/2015 | Ding ..................... G06F 3/0412 345/173 |
| 2015/0355762 | A1* | 12/2015 | Tripathi .................. G06T 1/20 345/173 |

* cited by examiner

Primary Examiner — Chad Dicke
(74) Attorney, Agent, or Firm — Patterson + Sheridan, LLP

(57) ABSTRACT

A processing system, input device, and method are provided for reducing interference in a capacitive sensing system. The processing system generally includes a sensor module configured to drive a first sensor electrode of a plurality of sensor electrodes with a first sensing signal during a first time period, wherein the first sensor electrode comprises a first display electrode of a display, the first display electrode configured for updating display pixels of the display and for capacitive sensing. The input device also includes a display driver configured to drive a first display line of display elements within the display with a display update signal during a second time period. The first time period at least partially overlaps with the second time period. Further, the first display line of display elements does not overlap the first sensor electrode.

19 Claims, 9 Drawing Sheets

TECHNIQUES FOR REDUCING CROSS TALK FOR SIMULTANEOUS TOUCH SENSING AND DISPLAY UPDATING

BACKGROUND

Field of the Disclosure

Embodiments generally relate to input sensing and, in particular, to techniques for reducing cross talk for simultaneous touch sensing and display updating.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Cross-talk may affect the signals received while operating a proximity sensor device for capacitive sensing. More specifically, interference signals generated by various components of the proximity sensor device may undesirably affect the operation of other components of the proximity sensor device. Thus, what is needed in the art are techniques for reducing the impact of cross-talk on proximity sensor devices.

SUMMARY

One example includes a processing system. The processing system generally includes a sensor module configured to drive a first sensor electrode of a plurality of sensor electrodes with a first sensing signal during a first time period, wherein the first sensor electrode comprises a first display electrode of a display, the first display electrode configured for updating display pixels of the display and for capacitive sensing. The processing system also includes a display driver configured to drive a first display line of display elements within the display with a display update signal during a second time period. The first time period at least partially overlaps with the second time period. Further, the first display line of display elements does not overlap the first sensor electrode.

Another example includes an input device. The input device includes a plurality of sensor electrodes that includes a first sensor electrode. The input device also includes a display including a plurality of display elements that includes a first display line of display elements, wherein the first sensor electrode comprises a first display electrode of the display, and wherein the first display electrode is configured for updating display pixels of the display and for capacitive sensing. The input device also includes a processing system. The processing system includes a sensor module configured to drive the first sensor electrode with a first sensing signal during a first time period. The processing system also includes a display driver configured to drive the first display line with a display update signal during a second time period. The first time period at least partially overlaps with the second time period. Further, the first display line of display elements does not overlap the first sensor electrode.

Another example includes a method. The method includes driving a first sensor electrode of a plurality of sensor electrodes with a first sensing signal during a first time period, wherein the first sensor electrode comprises a first display electrode of a display, the first display electrode configured for updating display pixels of the display and for capacitive sensing. The method also includes driving a first display line of display elements within the display with a display update signal during a second time period. The first time period at least partially overlaps with the second time period. Further, the first display line of display elements does not overlap the first sensor electrode.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide techniques for capacitive sensing of input objects with reduced cross-talk from display elements in a capacitive sensing device. The techniques generally include driving sensor electrodes such that the electrodes are "displaced from" concurrently driven display elements, in order to reduce capacitive coupling between active sensing and display elements. Driving sensor electrodes in this manner generally includes driving the sensor electrodes according to a timing in which active sensor electrodes do not "overlap" active display elements, to prevent a "parallel plate capacitor" effect, which would create large amounts of capacitive coupling and cross-talk. In some embodiments, sensor electrodes are driven ahead of display elements and routings to the sensor electrodes are shortened in order to reduce capacitive coupling between driven display elements and the routings to the sensor electrodes.

Figure 1:
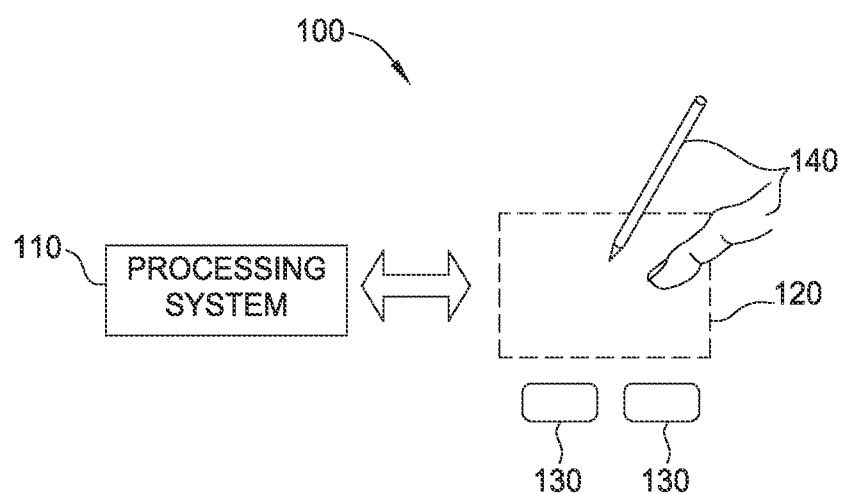
FIG. 1 is a block diagram of a system that includes an input device according to an example implementation.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
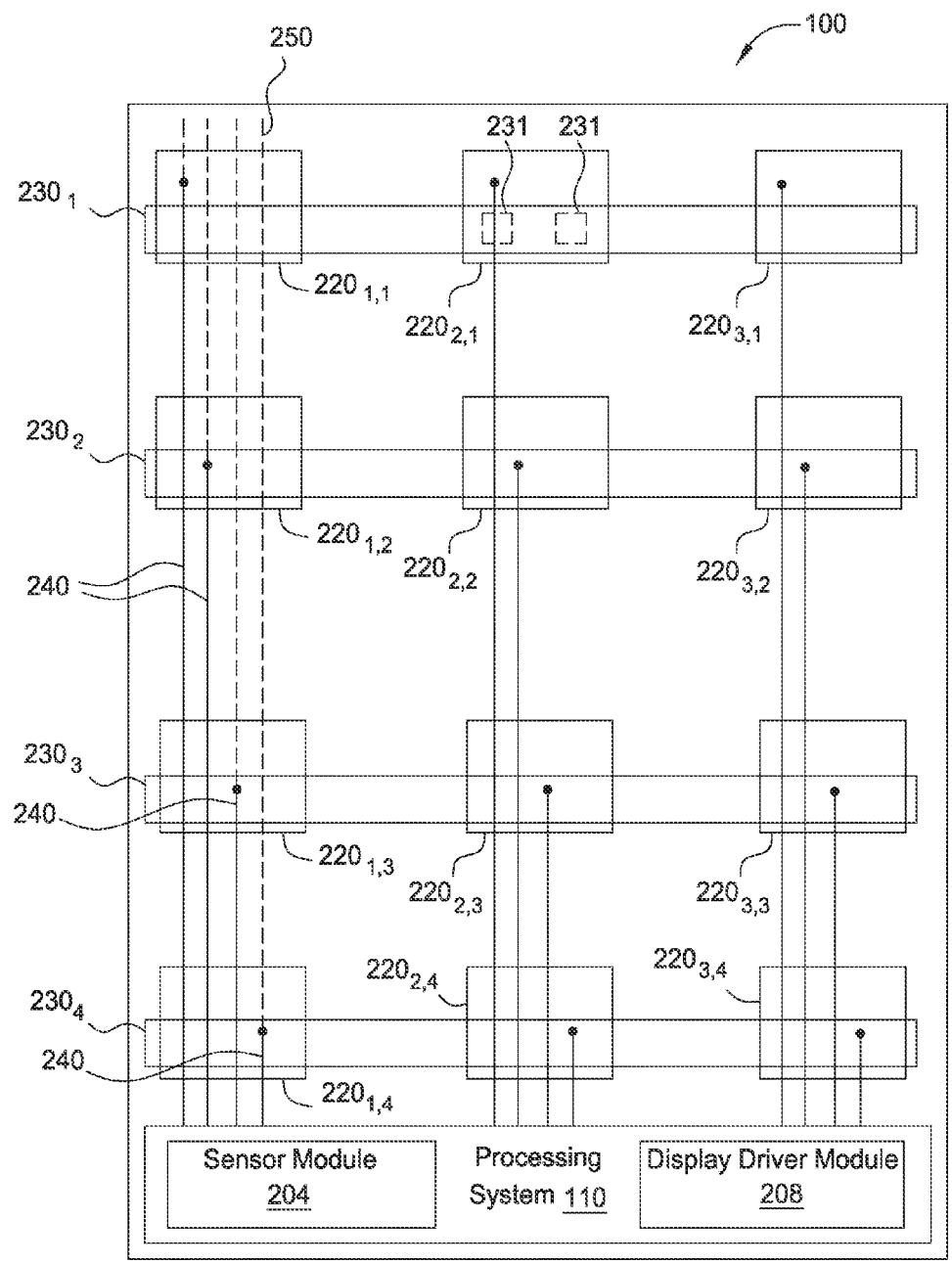
FIG. 2 shows specific components of input device including a plurality of sensor electrodes and a plurality of display element rows (also referred to herein as "display lines" or "display rows") that include display elements (not specifically shown), according to some embodiments.

FIG. 2 shows specific components of input device 100 including a plurality of sensor electrodes 220 and a plurality of display element rows 230 (also referred to herein as "display lines" or "display rows") that include display elements (many not specifically shown), according to some embodiments. For example, display element rows 230 may include display pixels 231 that are configured to display individual visual elements. It should also be understood that the various components of the input device that provide the display functionality may be referred to herein as a "display," or the input device 100, itself, may be referred to as the "display," since the input device 10 provides display functionality. The sensor electrodes 220 are coupled to the processing system 110 and utilized to determine the presence (or lack thereof) of an input object 140 in the sensing region 120. The display elements in display element rows 230 are also coupled to the processing system 110 and are utilized to update pixels displayed on the input device 100. The display element rows 230 include subscripts that identify a particular row, with the subscript increasing in value from top to bottom of the input device 100. For clarity of illustration, the individual display elements within the display element rows 230 are not specifically shown. Additionally, for clarity of illustration and description, FIG. 2 shows the sensor electrodes 220 in a pattern of simple rectangles, and does not show various other components.

The input device 100 includes an array of sensor electrodes $220_{X,Y}$ (referred to collectively as sensor electrodes 220) arranged in X columns and Y rows, wherein X and Y are positive integers. This arrangement may be referred to herein as a "matrix array." The sensor electrodes 220 within the matrix array may be formed within a single, common layer, meaning that the material that constitutes the sensor electrodes 220 may all be generally aligned in a layer or plane within input device 100. Although a specific number of sensor electrodes 220 are shown in FIG. 2, it is contemplated that any number of sensor electrodes 220 may be present in input device 100. Further, it is contemplated that the plurality of sensor electrodes 220 may have other configurations, such as polar arrays, repeating patterns, non-repeating patterns, a single row or column, or other suitable arrangement.

The sensor electrodes 220 are typically ohmically isolated from each other. That is, one or more insulators separate the sensor electrodes 220 and prevent them from electrically shorting to each other. In some embodiments, the sensor electrodes 220 are separated by an insulative gap. The insulative gap separating the sensor electrodes 220 may be filled with an electrically insulating material, or may be an air gap.

The processing system 110 is generally a processing component that may include any combination of software, hardware, and firmware configured to perform capacitive sensing operations and display update operations as described herein. More specifically, the processing system 110 may drive and receive with the sensor electrodes 220 to detect the presence of an input object 140 with various techniques. Some example techniques include self-capacitive ("absolute capacitance") sensing techniques and mutual-capacitance ("transcapacitance") sensing techniques, which are described in further detail below. The input device 100 may be configured to sense with any of the techniques described above. The input device 100 may also be configured to switch between any two or more of these techniques.

With absolute sensing techniques, processing system 110 is configured to drive sensor electrodes 220 with a signal and receive a resulting signal comprising effects corresponding to the signal. The processing system 110 uses these resulting signals to determine the position of the input object 140. Additionally, the processing system 110 may be configured to drive the sensor electrodes 220 row-by-row and then column-by-column. The signals generated by the sensor electrodes 220 in response to being driven in this configuration provide information related to the position of an input object 140 within the sensing region. The sensor electrodes 220 may be operated such that more than one sensor electrodes 220 is driven and received with individually at the same time, or sensor electrodes 220 are driven and received with collectively at the same time. In situations where the sensor electrodes 220 are driven and received with collectively at the same time, a single absolute capacitive measurement may be obtained from each of the one or more sensor electrodes 220 simultaneously. Alternatively, each of the sensor electrodes 220 are simultaneously driven and received with, obtaining different absolute capacitive measurements individually and simultaneously from each of the sensor electrodes 220. In various embodiments, processing system 110 may configured to selectively drive and receive with only a portion of sensor electrodes 220 in a particular capacitive frame. For example, the sensor electrodes 220 may be selected based on, but not limited to, an application running on a host processor, a status of the input device 100, and an operating mode of the input device 100.

With transcapacitive sensing techniques, the sensor electrodes 220 may be split into groups of transmitter and receiver electrodes to detect the presence of an input object 140. That is, processing system 110 may drive a first group of sensor electrodes 220 with a signal and receive resulting signals with the second group of sensor electrodes 220, where a resulting signal comprising effects corresponding to the signal with which the sensor electrodes 220 are driven. Such resulting signals are capacitively induced in the receiver electrodes by the signal driven onto the transmitter electrodes. The resulting signal is utilized by the processing system 110 or other processor to determine the presence and/or position of the input object 140. Transmitter electrodes may be operated such that one transmitter electrode transmits at one time, or multiple transmitter electrodes transmit at the same time. Where multiple transmitter electrodes transmit simultaneously, the multiple transmitter electrodes may transmit the same signal and effectively produce an effectively larger transmitter electrode. Alternatively, the multiple transmitter electrodes may transmit different signals. For example, multiple transmitter electrodes may transmit different signals according to one or more coding schemes that enable their combined effects on the resulting signals to be independently determined. The sensor electrodes 220 configured as receiver sensor electrodes may be operated singly or multiply to acquire resulting signals. The resulting signals may be used to determine measurements of the capacitive couplings at the capacitive pixels.

Areas of localized capacitive coupling may be termed "capacitive pixels." Capacitive pixels may be formed between one or more sensor electrodes 220 and ground with the absolute capacitance sensing techniques or between one or more sensor electrodes 220 used as transmitter electrodes and one or more sensor electrodes 220 used as receiver electrodes with the transcapacitive sensing techniques. These localized capacitive couplings may change with the proximity and motion of input objects 140 in the sensing region 120, and thus may be used as an indicator of the presence of the input object in the sensing region 120.

A set of measurements from the capacitive pixels form a "capacitive image" (also "capacitive frame") representative of the capacitive couplings at the capacitive pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object 140 in the sensing region 120. The background capacitance changes with the environment and operating conditions, and may be estimated in various ways. For example, some embodiments take "baseline images" when no input object 140 is determined to be in the sensing region 120, and use those baseline images as estimates of their background capacitances.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 220 comprise one or more display electrodes used in display updating. In one or more embodiments, the display electrodes comprise one or more segments of a $V_{COM}$ electrode ("common voltage electrode"), a source drive line, gate line, an anode electrode or cathode electrode, or any other display element (as stated elsewhere, these display elements may constitute the display elements of the display element rows 230). These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), and the like. In such embodiments, the display electrode can also be referred to as a "combination electrode", since the display electrode performs multiple functions. In various embodiments, each of the sensor electrodes 220 comprises one or more display electrodes. In other embodiments, at least two sensor electrodes 220 may jointly form one display electrode.

For providing the display functionality, input device 100 includes display elements, such as various electrodes, access transistors, liquid crystal material for a liquid crystal display ("LCD"), organic material for an OLED, and the like. For simplicity, these display elements are not shown in detail in FIG. 2. Rather, a rough indication of positions of these display elements are indicated as display element rows 230 in FIG. 2. More specifically, the display element rows 230 shown in FIG. 2 illustrate positions of various elements that constitute display pixels, such as access transistors, light-controlling material (e.g., liquid crystal material or organic OLED material), and the like.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

In one or more embodiments, capacitive sensing (or input sensing) and display updating may occur during at least partially overlapping periods. For example, capacitive sensing and display updating may be occur during a display update period. Capacitive sensing may also occur during non-display update periods, which do not overlap with the display update periods during which display updating occurs. In various embodiments, the non-display update periods may occur between two display update periods of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 220 for capacitive sensing during any one or more of or any combination of the different non-display update times, or during a display update time.

Continuing to refer to FIG. 2, the processing system 110 coupled to the sensing electrodes 220 includes a sensor module 204 comprising sensor circuitry and a display driver module 208 comprising display circuitry. The sensor module 204 includes sensor circuitry configured to drive the sensor electrodes 220 for capacitive sensing during periods in which input sensing is desired. In one embodiment, driving the sensor electrodes 220 for capacitive sensing comprises driving the sensor electrodes 220 with a modulated signal. The modulated signal is generally a modulated signal containing one or more bursts over a period of time allocated for input sensing. The modulated signal may have an amplitude, frequency and voltage which may be changed to obtain more robust location information of the input object in the sensing region 120. The sensor module 204 may be selectively coupled to one or more of the sensor electrodes 220. For example, the sensor module 204 may be coupled to selected portions of the sensor electrodes 220. In another example, the sensor module 204 may be coupled to a different portion of the sensor electrodes 220. In yet another example, the sensor module 204 may be coupled to all the sensor electrodes 220 and operate in either an absolute or transcapacitive sensing mode. The sensor module may be further configured to drive one or more sensor electrodes with a shield signal, having a substantially constant voltage or a varying voltage signals (also referred to as a guard signal) during capacitive sensing periods. The shield signal may have a similar, higher or lower amplitude than the modulated signal.

The sensor module 204 may further include circuitry and/or software configured to receive a resulting signal with the sensor electrodes 220 comprising effects corresponding to the modulated signal during periods in which input sensing is desired. In one embodiment, the resulting signals received with a first sensor electrode may comprise effects corresponding to a modulated signal driven onto a second sensor electrode. In another embodiment, the resulting signals received with a first sensor electrode comprise effects corresponding to a modulated signal driven onto the first sensor electrode. The sensor module 204 may determine a position of the input object 140 in the sensing region 120 or may provide a signal including information indicative of the resulting signal to another module or processor, for example, determination module or a processor of the electronic device (i.e., a host processor), for determining the position of the input object 140 in the sensing region 120.

The display driver module 208 may be included in or separate from the processing system 110. The display driver module 208 includes display circuitry configured to provide display image update information to the display elements of the display element rows 230 for display updating. The various modules described above (e.g., sensor module 204, display driving module 208, determination module, and the like) may be all included in a single integrated circuit or included in different integrated circuits. Additionally, portions of each module may be included in a single or in different integrated circuits. For example, a first portion of sensor module 204 may be on a first integrated circuit on which the display driver module 208 is disposed, while a second portion of sensor module 204 may be on a second integrated circuit. In yet another embodiment, display processing and/or touch processing may be performed with a first integrated circuit while display driving and touch driving may be performed with a second integrated circuit. For example, a timing controller may perform touch processing while a second integrated circuit, such as a source driver, may perform display driving and sensor electrode driving.

The sensor electrodes 220 may be formed as discrete forms, e.g. polygons, bars, pads, lines or other shape, which are ohmically isolated from one another. The sensor electrodes 220 may be electrically coupled through circuitry to form electrodes having larger plan area relative to a discrete one of the sensor electrodes 220. The sensor electrodes 220 may be fabricated from opaque or non-opaque conductive materials. In embodiments wherein the sensor electrodes 220 are utilized with a display device, it may be desirable to utilize non-opaque conductive materials for the sensor electrodes 220. In embodiments wherein the sensor electrodes 220 are not utilized with a display device, it may be desirable to utilize opaque conductive materials having lower resistivity for the sensor electrodes 220 to improve sensor performance. Materials suitable for fabricating the sensor electrodes 220 include ITO, aluminum, silver, copper, and conductive carbon materials, among others. The sensor electrodes 220 may be formed as contiguous body of conductive material having little or no open area (i.e., having a planar surface uninterrupted by holes), or may alternatively be fabricated to form a body of material having openings formed therethrough. For example, the sensor electrodes 220 may be formed from a mesh of conductive material, such as a plurality of interconnected thin metal wires. In one embodiment, at least one of the length and width of the sensor electrodes 220 may be in a range of about 1 to about 2 mm. In other embodiments, at least one of the length and width of the sensor electrodes may be less than about 1 mm or greater than about 2 mm. In other embodiment, the length and width may not be similar, and one of the length and width may be in the range of about 1 to about 2 mm. Further, on various embodiments, the sensor electrodes 220 may comprise a center to center pitch in the range of about 4 to about 5 mm; however, in other embodiments, the pitch may be less than about 4 mm or greater than about 5 mm.

It may be desirable to operate the display elements of the display element rows 230 for display updating during a display time period that at least partially overlaps with a sensing time period in which sensing is performed with the sensor electrodes 220. Such an overlapping timing scheme may be desirable because, by overlapping these time periods, the total amount of time consumed by display updating and capacitive sensing is reduced, which allows more sensor electrodes 220 and/or display elements of the display element rows 230 to be driven per unit of time (i.e., display frame or sensing frame) and/or allows more time to be spent driving each sensor electrode 220 and/or display elements of the display element rows 230.

Despite these benefits, such overlapping timing may generally be difficult because such overlapping timing may introduce cross-talk between display elements of the display element rows 230 and sensor electrodes 220. For example, operating an electrode for a particular display element of the display element rows 230 may induce current flow in one or more of the sensor electrodes 220. This current flow may cause the processing system 110 to incorrectly detect or incorrectly not detect an input object 140.

Thus techniques are proposed herein to allow such overlapping timing to occur while reducing cross-talk between sensor electrodes 220 and display elements. The techniques provided herein generally involve operating the input device 100 according to certain timings for driving sensor electrodes 220.

As used herein, the term "concurrently driven sensor electrode 220" means a sensor electrode 220 that is driven at the same time as at least one display element of the display element rows 230. Additionally, the term "concurrently driven display element" means a display element of the display element rows 230 that is driven at the same time as at least one sensor electrode 220. The term "active sensor electrode 220" means a sensor electrode 220 that is being driven for capacitive sensing and the term "active display element" means a display element of the display element rows 230 that is being driven for display updating.

In general, when operating the display elements of the display element rows 230 for updating the display, display driver module 208 drives the display elements of the display element rows 230 in a sequential line-by-line manner, proceeding from one side of the input device 100 to the other side. In one example, in each display frame, the display driver module 208 drives display elements in a first display element row $230_1$, then drives display elements in a next display element row $230_2$, and so on in that order until display elements in a final display element row $230_4$. In general, display elements are driven together in rows because access transistors within each row have gates that are coupled together and are thus activated together (although such a scheme is not always used—for example, in some situations, only a subset of access transistors in a row of display elements may have gates that are coupled together).

Figure 3A:
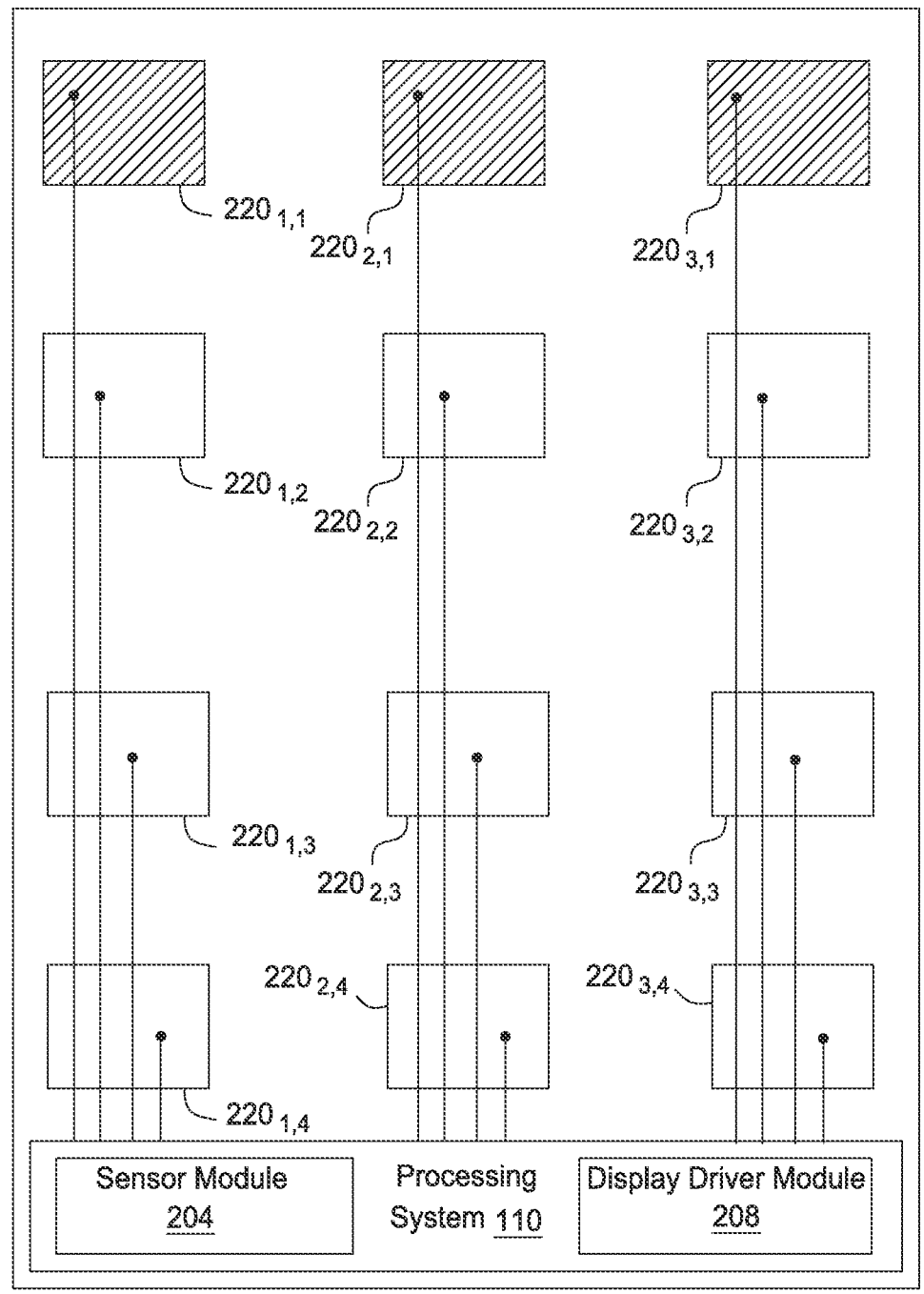
FIGS. 3A-3D illustrate a scheme for driving sensor electrodes in which the ratio between the capacitive frame rate and the sensing frame rate is 1:1.
Figure 4:
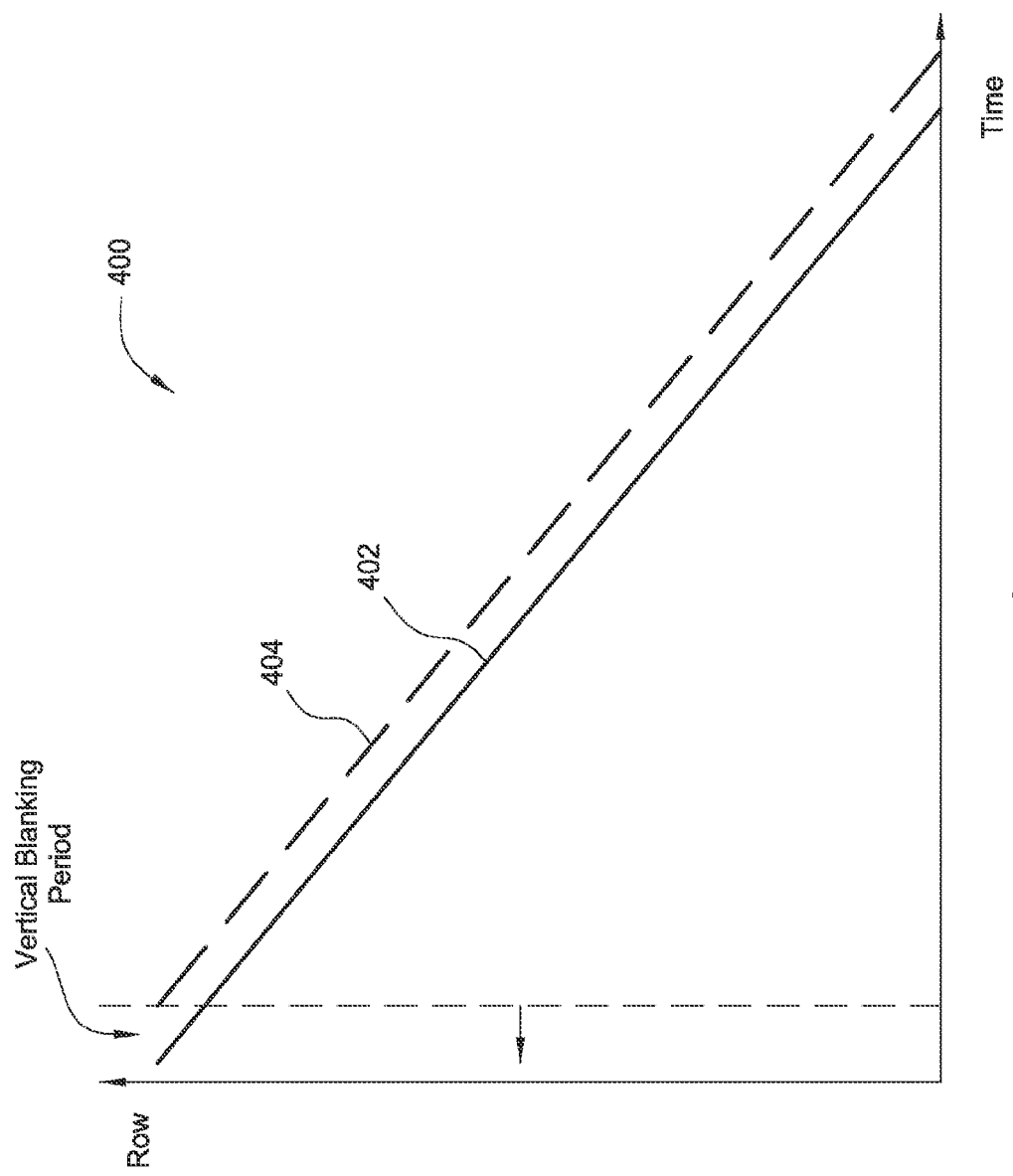
FIG. 4 is a graph that illustrates the comparative order between touch sensor driving and display row driving in a 1:1 touch sensing rate-to-display update rate ratio.
Figure 5:
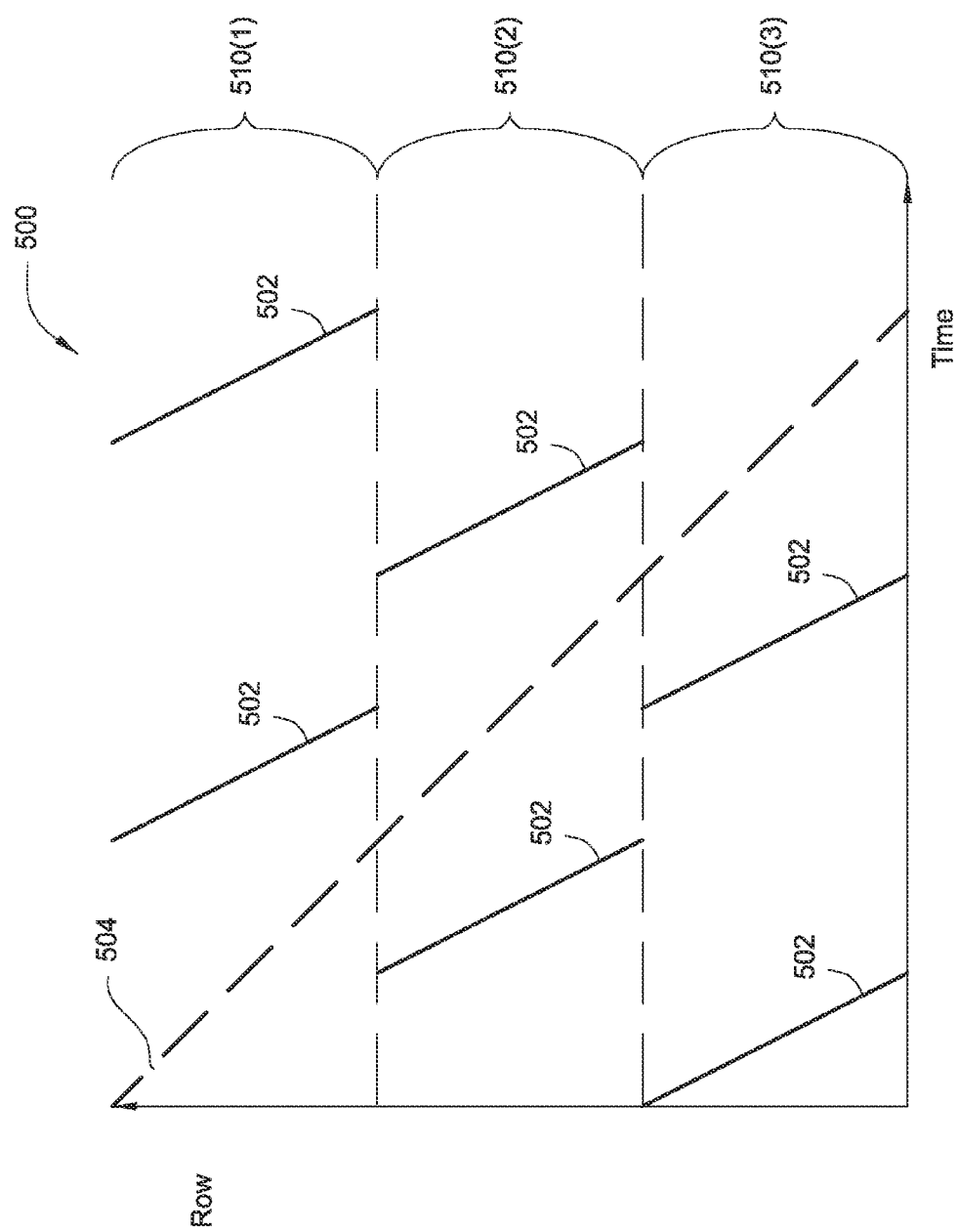
FIG. 5 is a graph that illustrates the comparative order between touch sensor driving and display row driving in a ratio that is not 1:1.

To reduce the above-described cross-talk, the sensor module 204 is configured to drive the sensor electrodes 220 for sensing according to one of several timings, given this sequential line-by-line order of driving display elements. FIGS. 3A-4 illustrate a first timing in which the capacitive frame rate is substantially the same as the display frame rate and FIG. 5 illustrates a second timing in which the capacitive frame rate is two times as fast as the display frame rate. Although certain specific timings are shown and described, these timings are generally in according with certain principles, and other timings that follow these principles are within the scope of this disclosure.

One such principle includes the fact that throughout a combined display/sensing update period in which capacitive sensing and display updating is performed at the same time, sensor electrodes 220 are spaced apart from or distant from the display elements that are driven at the same time. Generally, the direction in which the concurrently driven sensor electrodes 220 are spaced apart from the concurrently driven display element row 230 is referred to herein as a "top-to-bottom direction," which is the direction of the sequence in which the display element rows 230 are driven. Being spaced apart in this manner prevents driven sensor electrodes 220 from overlapping with and thus forming a "parallel plate capacitor" with display elements in the display element rows 230. Such an overlap or "parallel plate capacitor" would cause undesirable cross-talk between sensor electrodes 220 and display components, due to strong capacitive coupling, which could lead to undesirable function. Optionally, the timing is chosen such that each sensor electrode 220 is substantially maximally distant from the display elements that are driven at the same time as that sensor electrode 220, in order to reduce cross-talk caused by fringing field effects.

Another such principle is related to the routings 240 to the sensor electrodes 220. These routings 240 (also referred to herein as "capacitive routing traces") generally comprise conductive lines that transmit signals between the processing system 110 and the sensor electrodes 220. The routings 240 disclosed herein only extend to particular sensor electrodes 220 and not past those sensor electrodes 220. In prior art systems, the routings would extend past the sensor electrodes 220 to which the routings are attached. Such extended routings are illustrated via routing extensions 250. It should be understood that these extended routings 250 are not features of the input device 100 of the present disclosure but are simply illustrations of features that are different from the routings 240 that are part of the input device 100 of the present disclosure.

The principle described in reference to the feature of the length of these routings 240 is that each sensor electrode 220 is "below" the display electrodes of the display element row 230 driven at the same time as those sensor electrodes 220. "Below" refers to the top-to-bottom direction in which the display elements of the display rows 230 are driven. More specifically, a sensor electrode 220 is located more towards the "bottom" of the input device 100 than a concurrently driven display element row 230. The "bottom" is the direction in which the routings 240 grow shorter. It should be understood that although a specific directionality—i.e., "top" and "bottom" of the input device 100 is discussed, the invention is not limited to such a specific directionality. Thus, the principle described above can be more generally stated as sensor electrodes 220 are driven from one end of the input device 100 to an opposite end of the input device 100 in an order of decreasing routing length 240.

By configuring and positioning the display elements of the display rows 230 and the routings 240 in this described manner, display elements within the display element rows 230 are not driven while those display elements are overlapping routings 240 coupled to sensor electrodes 220 that are driven for capacitive sensing at the same time as those display elements are driven for display updates. For example, display element row $230_2$ is driven concurrently with sensor electrodes $230_{1,3}$, $230_{2,3}$, and $230_{3,3}$ so that display element row $230_2$ does not overlap (and thus form a "parallel plate capacitor" with) the routings 240 that are coupled to sensor electrodes $230_{1,3}$, $230_{2,3}$, and $230_{3,3}$. By not overlapping such routings 240, the capacitive coupling between driven display elements and routings 240 that convey signals from driven sensor electrodes 220 is reduced.

Additionally, by driving the sensor electrodes 220 such that the driven display element rows 230 remain "above" the concurrently-driven sensor electrodes 220, the impact of the driven display element rows 230 on routings 240 not coupled to the concurrently-driven sensor electrodes 220 (that can still convey signals to the processing system 110) is reduced. More specifically, impedance is related to wire length. Because wire length is longer for routings 240 that are overlapped by the concurrently-driven display element row 230 than for the concurrently-driven sensor electrodes 220, and because higher impedance filters signals better as compared with lower impedance, the impact of the signal from the routings 240 overlapped by the concurrently-driven display element row 230 is generally reduced or minimized.

The above-described principles may not be applied in all cases. The ratio of the capacitive frame rate to the display frame rate may affect which of the principles are applied. When the capacitive frame rate is the same as the display frame rate (also referred to herein as "the ratio being 1:1"), each of the principles described above may be applied. On the other hand, when the ratio of display frame rate to capacitive frame rate is not 1:1, the principle that active display elements do not overlap active sensor electrodes 220 applies, but the principle that the active display elements always stay "above" the active sensor electrodes 220 may not always apply.

FIGS. 3A-3D and FIG. 4 illustrate a scheme for driving sensor electrodes 220 in which the ratio between the capacitive frame rate and the sensing frame rate is 1:1. FIGS. 3A-3D illustrate a sequence of display line and sensor electrode 220 activations and FIG. 4 is a graph that illustrates the scheme in graph form.

For clarity, only active display element rows 230 are depicted in FIGS. 3A-3D. In FIG. 3A, top-most sensor electrodes $220_{1,1}$, $220_{2,1}$, and $220_{3,1}$ are driven for capacitive sensing. Because these top-most sensor electrodes $220_{1,1}$, $220_{2,1}$, and $220_{3,1}$ are at the "top" of the input device 100, and because there is no row of display elements that is above the top-most sensor electrodes $220_{1,1}$, $220_{2,1}$, and $220_{3,1}$, the top-most sensor electrodes $220_{1,1}$, $220_{2,1}$, and $220_{3,1}$ are driven for sensing in a period before the display frame. Such a period may be a vertical blanking period, as is generally known, or another period. The vertical blanking period may be at the end of the display frame. In such an embodiment, touch sensing would begin with display updating, with the "first" sensor electrode row (e.g., the top-most sensor electrode row) skipped or delayed until later. Then, in the vertical blanking period, the skipped row could be sensed with. The vertical blanking period may also be within a particular display frame, as opposed to before or after the display frame. In such a scenario, a "skipped" or other appropriate row of sensor electrodes 220 would be driven for capacitive sensing. In addition, while described herein as being driven in "rows" of sensor electrodes 220, other orientations and/or collections of sensor electrodes 220 could be driven together. Regardless of the particular orientation or collection with which the sensor electrodes 220 are driven for capacitive sensing, the sensor electrodes 220 would still be driven to avoid overlapping active sensor electrodes 220 with active display elements, and also, preferably, to avoid overlapping capacitive routing traces of driven sensor electrodes 220 with active display elements.

Figure 3B:
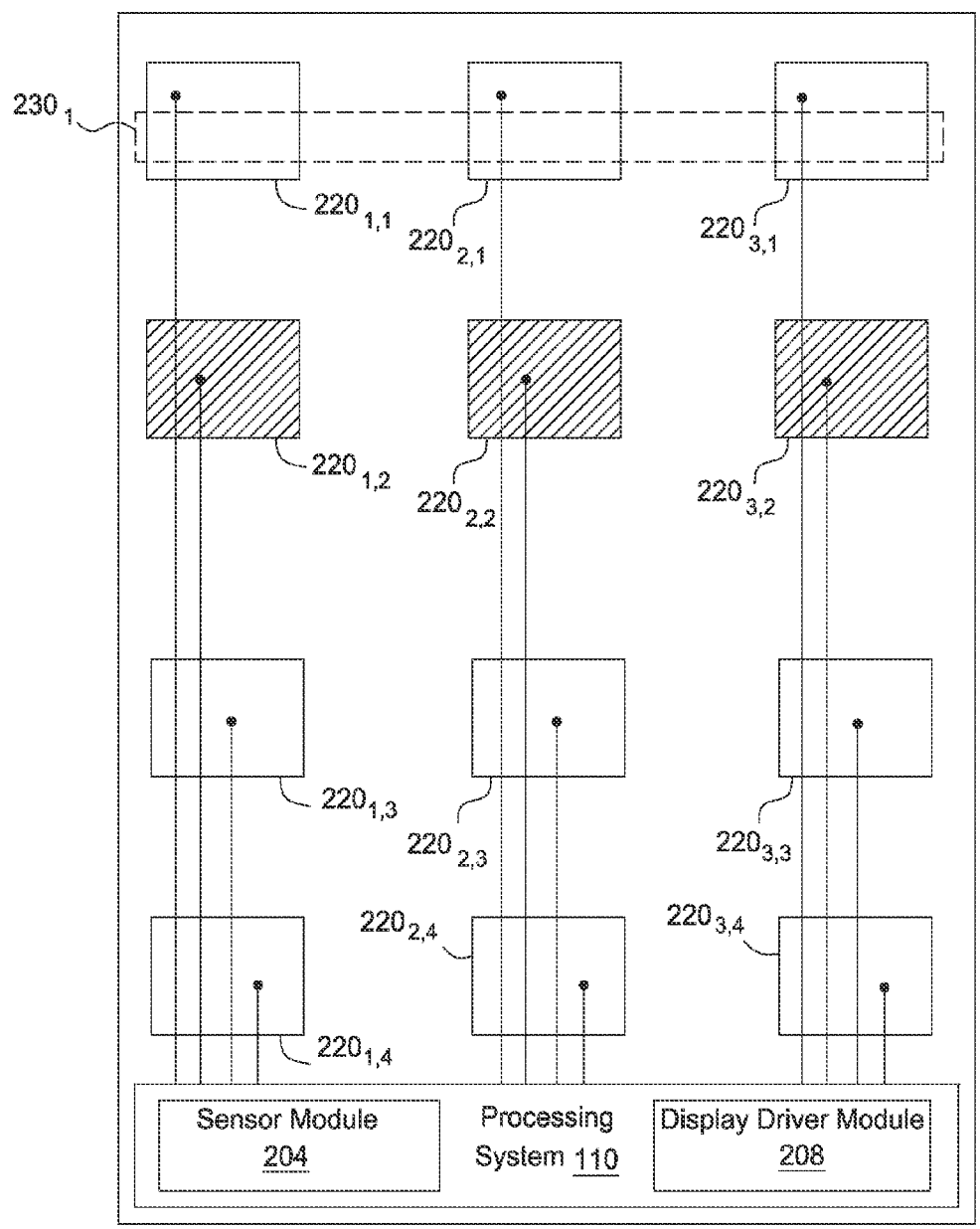

In FIG. 3B, a second row of sensor electrodes $220_{1,2}$, $220_{2,2}$, and $220_{3,2}$ is driven for capacitive sensing during a display frame. Because the top-most display element row $230_1$ is above the second row of sensor electrodes $220_{1,2}$, $220_{2,2}$, and $220_{3,2}$, that top-most display element row $230_1$ is driven for display updating while the second row of sensor electrodes $220_{1,2}$, $220_{2,2}$, and $220_{3,2}$ are driven for capacitive sensing. As can be seen, the driven display element row $230_1$ does not overlap the second row of sensor electrodes $220_{1,2}$, $220_{2,2}$, and $220_{3,2}$. Further, because the display element row $230_1$ is above these sensor electrodes, the display element row $230_1$ does not overlap the routings 240 coupled to the second row of sensor electrodes $220_{1,2}$, $220_{2,2}$, and $220_{3,2}$. Additionally, because the display element row $230_1$ overlaps a routing 240 that is longer than the routing 240 coupled to the second row of sensor electrodes $220_{1,2}$, $220_{2,2}$, and $220_{3,2}$, the impedance experienced by signals from the display element row $230_1$ is higher than the impedance experienced by signals from the second row of sensor electrodes $220_{1,2}$, $220_{2,2}$, and $220_{3,2}$.

Figure 3C:
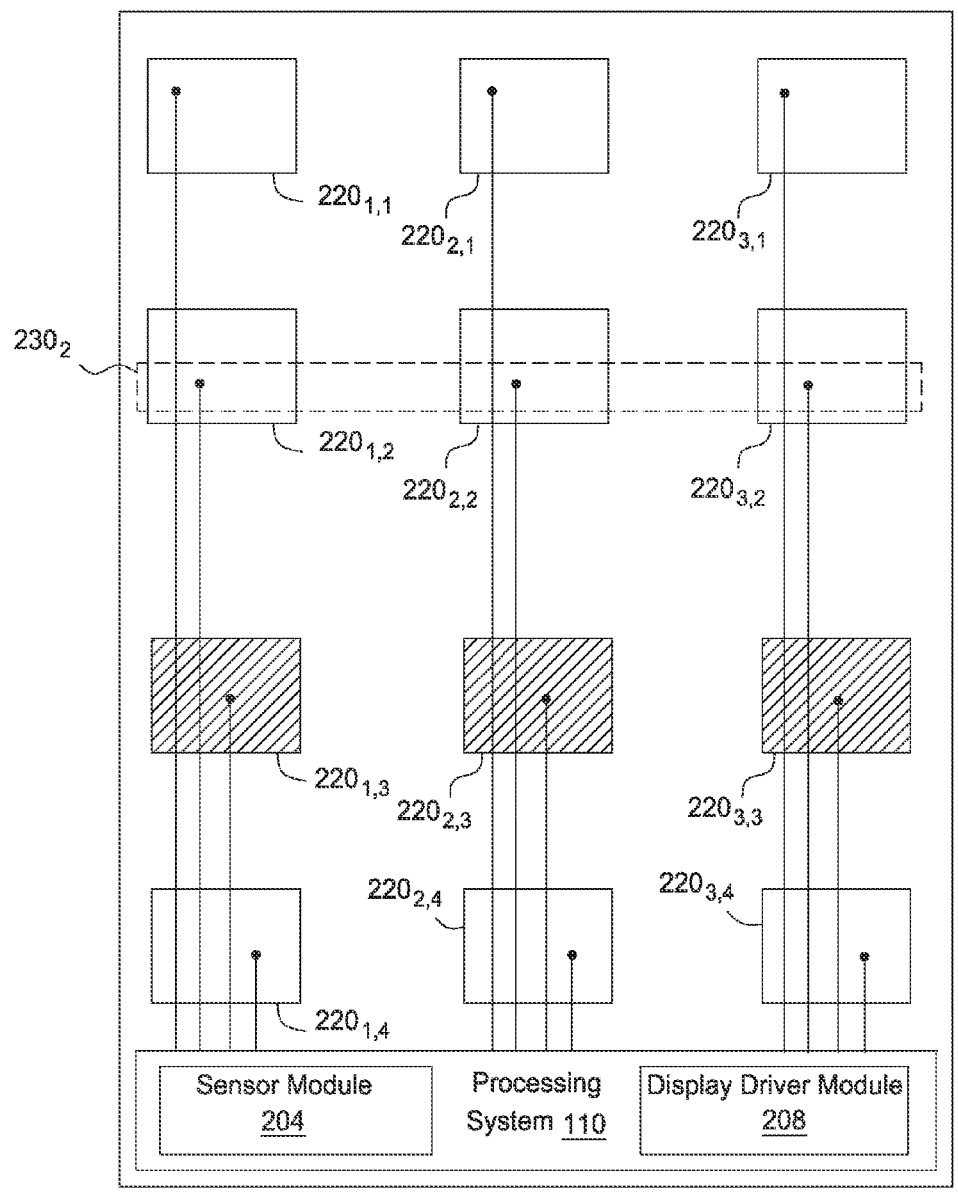
Figure 3D:
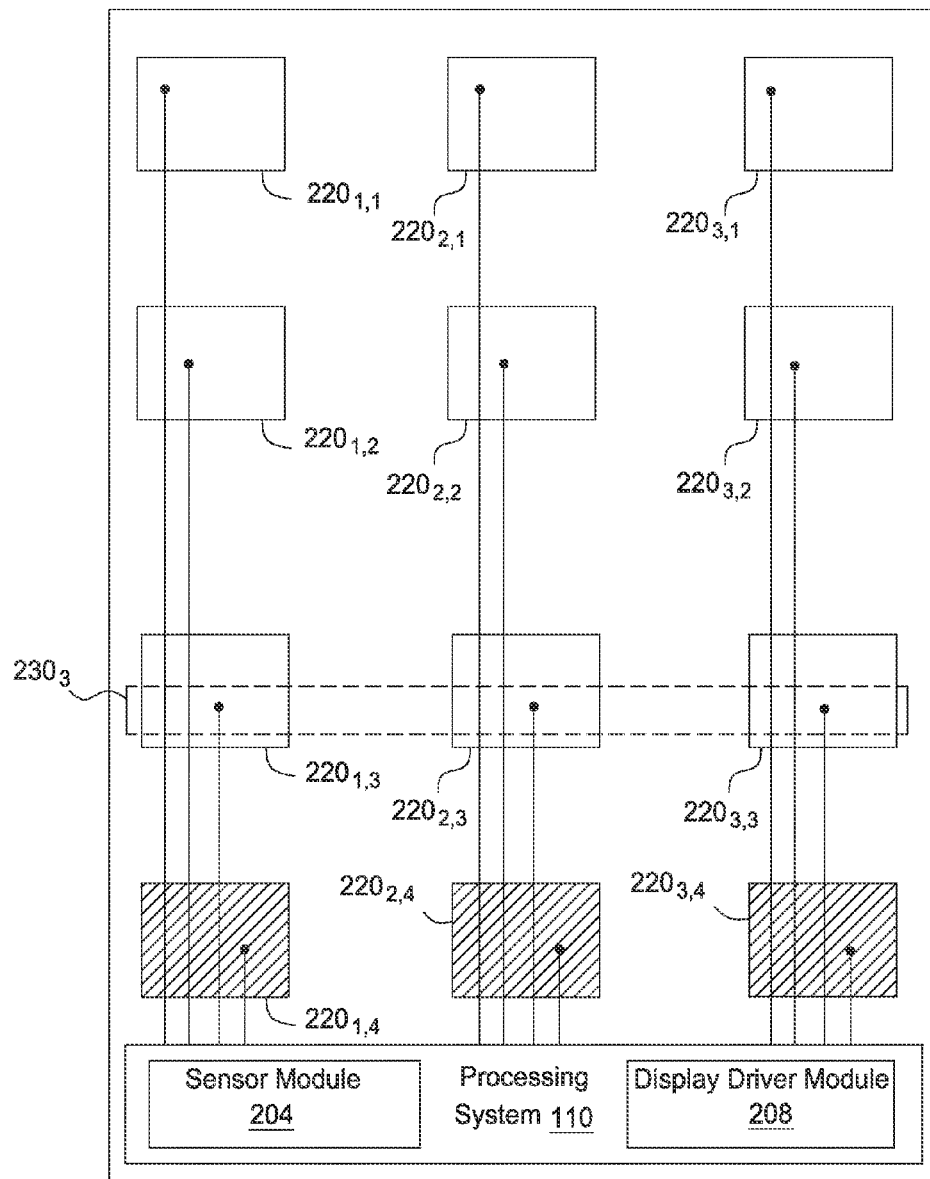

In FIG. 3C, a third row of sensor electrodes $220_{1,3}$, $220_{2,3}$, and $220_{3,3}$ is driven for capacitive sensing during the display frame. Additionally, the next display element row—display element row $230_2$—is driven for display updating at the same time. As with FIG. 3B, display element row $230_2$ is above and does not overlap the third row of sensor electrodes $220_{1,3}$, $220_{2,3}$, and $220_{3,3}$, thus reducing the cross-talk experienced by the sensor electrodes 220 and display element rows 230. Similarly, in FIG. 3D, a fourth row of sensor electrodes $220_{1,4}$, $220_{2,4}$, and $220_{3,4}$ is driven for capacitive sensing while display element row $230_3$ is driven for display updating. Although not shown, after the events shown in FIG. 3D, a fourth display element row $230_4$ (shown in FIG. 2) would be driven for display updating and no sensing would be performed.

Referring now to FIG. 4, a graph 400 illustrates the comparative order between touch sensor driving and display row driving in a 1:1 touch sensing rate-to-display update rate ratio. More specifically, touch sensor line 402 illustrates that at an early point in time, i.e., in a vertical blanking period, a top row of sensor electrodes 220 is driven for capacitive sensing prior to any display element rows 230 being driven for display updates. As time proceeds, rows of the sensor electrodes 220 are driven for capacitive sensing in a top-to-bottom order ahead in time as compared with the manner in which the display element rows 230 are driven.

FIG. 5 is a graph 500 that illustrates the comparative order between touch sensor driving and display row driving in a ratio that is not 1:1. The ratio illustrated in FIG. 5 is instead a ratio in which sensing is performed twice as fast as display updating (referred to as a "2:1" ratio, the convention used herein being that the number before the colon refers to the sensor frame rate and the number after the colon refers to the display frame rate). It should be understood that while such a ratio is illustrated in FIG. 5, the present disclosure contemplates that other ratios may be used. Further, although a specific pattern for touch sensing is shown and described, other patterns are also within the scope of this disclosure. Such other patterns will be described in more detail below.

As shown by graph 500, within a particular frame, as time proceeds (left-to-right in the graph 500), display updating proceeds in a downwards direction in terms of rows. More specifically, as time proceeds, display updating first occurs at a top display element row 230, then occurs for a next display element row 230 in a downwards direction, and so on until a bottom-most display element row 230. Capacitive sensing locally proceeds in a downwards direction, but "jumps" between row groups 510 periodically (which may also be referred to herein as "vertical subdivisions" of sensor electrodes). Thus, capacitive sensing proceeds in a "staggered" order through the input device 100. More specifically, at the start of the frame, capacitive sensing begins at a bottom-most row group 510(3) and proceeds in a downwards direction within this row group 510(3). After completing this bottom-most row group 510(3), capacitive sensing proceeds to a middle row group 510(2) and proceeds in a downwards direction within that middle row group 510(2). After completing the middle row group 510(2), capacitive sensing proceeds to a top row group 510(1) and senses within that top row group 510(1). Capacitive sensing repeats this pattern of bottom-most row group 510(3), middle row group 510(2), and top-most row group 510(1) for the second capacitive frame within the display frame shown in FIG. 5.

The purpose of "jumping" row segments 510 in the manner illustrated by graph 500 is to prevent active display element rows 230 from overlapping (and thus forming a "parallel plate capacitor" with) active sensor electrodes 220. By preventing such overlapping, the strong cross-talk signals associated with such overlapping are generally avoided, which reduces the interference experienced by the sensor electrodes 220 and improves the ability of the processing system 110 to detect presence of an input object 140 within the sensing region 120.

As described above, although a particular technique for performing capacitive sensing and display updating for a 2:1 ratio is illustrated, other techniques and/or configurations are possible, so long as active display element rows 230 do not overlap with active sensor electrodes 220. In one example, capacitive sensing and display updating may be performed with a 3:1 or higher ratio. In another example, a single capacitive image may be spread out over multiple display frames, such as with a 3:2 ratio. In yet another example, the directionality of the order in which sensor electrodes are driven may differ from that described above. In other words, instead of being driven from a "top" to a "bottom" of the input device 100, the sensor electrodes 220 can be driven in any direction, corresponding to a direction from one particular end of the input device 100 to another end of the input device 100.

Figure 6:
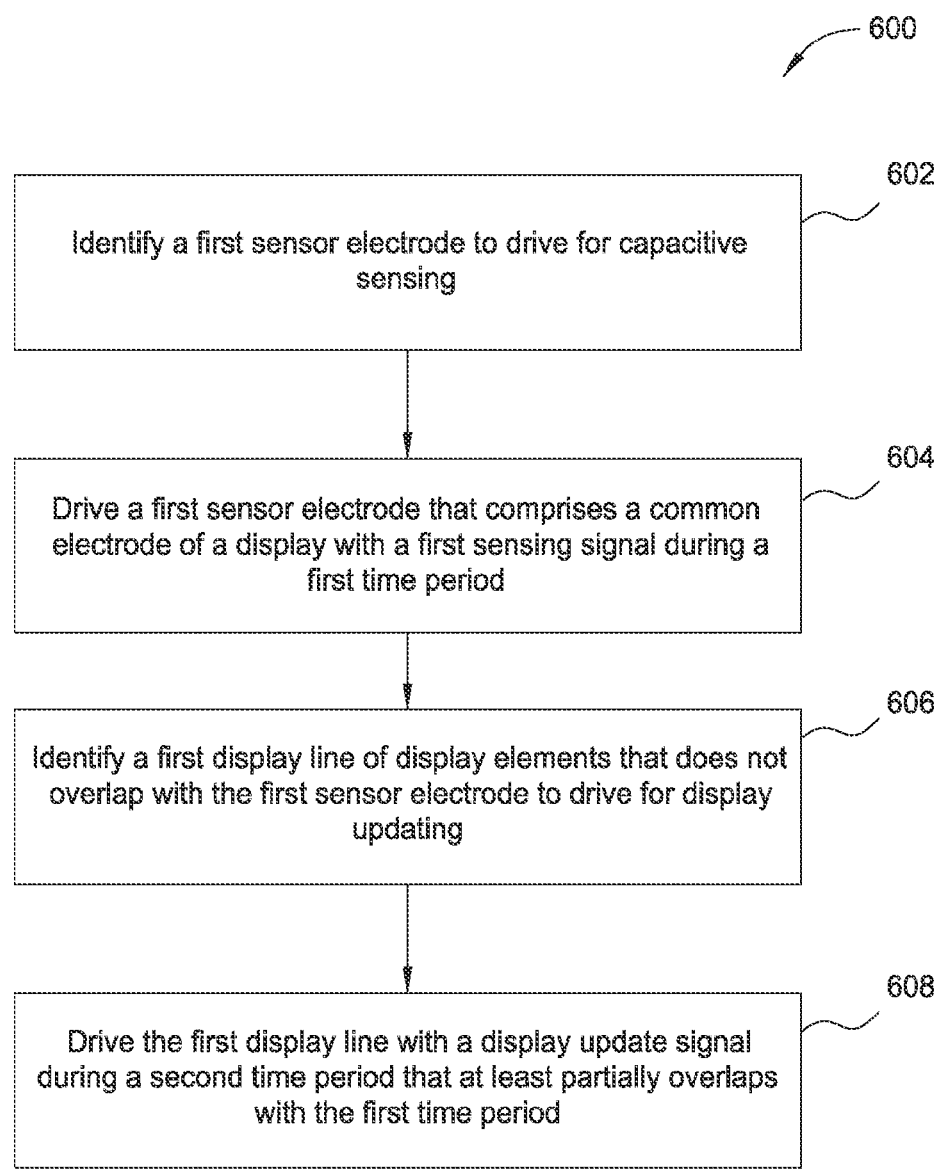
FIG. 6 is a flow diagram of method steps for driving display elements and sensor electrodes in an at least partially overlapping time period, according to an example.

FIG. 6 is a flow diagram of a method 600 for driving display elements and sensor electrodes 220 in an at least partially overlapping time period, according to an example. Although the method steps are described in conjunction with FIGS. 1-5, persons skilled in the art will understand that any system configured to perform the method steps, in various alternative orders, falls within the scope of the present disclosure.

As shown, the method 600 begins at step 602, where the processing system 110 identifies a first sensor electrode 220 to drive for capacitive sensing. At step 604, the processing system 110 drives a first sensor electrode that comprises a common electrode of a display with a first sensing signal during a first time period. At step 606, the processing system 110 identifies a first display line of display elements that does not overlap with the first sensor electrode 220 to drive for display updating. At step 608, the processing system 110 drives the first display line with a display update signal during a second time period that at least partially overlaps with the first time period.

In sum, techniques are provided for driving sensor electrodes of an input device for capacitive sensing at the same time that display elements of the input device are driven for display updating. The techniques generally comprise driving the sensor electrodes in a particular order so that the driven sensor electrodes do not "overlap" with concurrently driven display elements. In one example, the sensor electrodes are driven "ahead in time" with respect to the order in which the display elements are driven. In another example, the sensor electrodes are driven in a staggered manner, avoiding driving sensor electrodes simultaneously with concurrently driven display driver elements.

Advantages of the disclosed techniques include that capacitive sensing may be performed while display updating is performed in a manner that does not introduce large amounts of undesirable cross-talk. Performing capacitive sensing while performing display updating allows for capacitive sensing and display updated to be performed in a more "condensed" period of time, which provides timing benefits to an input device that performs the touch sensing and display updating in this manner. Some examples of these timing benefits generally include, without limitation one or more of the following: the total amount of time used for touch sensing and display updating is reduced, and the amount of time used for sensing with each sensor electrode can be increased while still fitting the entirety of the touch sensing and display update timing within a particular period of time.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for capacitive sensing, the processing system comprising:
   a sensor module configured to:
      drive a first sensor electrode of each of a plurality of columns of sensor electrodes with a first sensing signal during a first blanking period before a display frame, wherein the first sensor electrode comprises a first display electrode at a first edge of a display, the first display electrode configured for updating display pixels of the display and for capacitive sensing,
      starting at a first time period after the first blanking period, drive the other sensor electrodes of the plurality of columns of sensor electrodes with sensing signals from the first edge of the display to a second edge of the display, wherein:
         the sensor electrodes are driven by capacitive routing traces, and
         the capacitive routing trace for driving a sensor electrode does not overlap any display line of a row of display elements nearer to the first edge of the display than the sensor electrode; and
   a display driver configured to:
      during a second time period that at least partially overlaps the first time period, drive a first display line of rows of display elements at the first edge of the display with a display update signal during the display frame, and
      after the second time period, drive remaining display lines of rows of display elements with display update signals from the first edge of the display to the second edge of the display during the display frame,
   wherein, during the display frame, while driving the plurality of columns of sensor electrodes from the first edge to the second edge of the display, the capacitive routing trace for each sensor electrode, of the plurality of columns of sensor electrodes, while being driven with one of the sensing signals does not overlap the display line of the row of display elements being driven concurrently with one of the display update signals.

2. The processing system of claim 1, wherein:
   the sensor module is further configured to drive a second sensor electrode of each of the plurality of columns of sensor electrodes with a second sensing signal in a vertical blanking period that occurs after the display frame.

3. The processing system of claim 1, wherein:
   the sensor module is further configured to:
      drive the plurality of columns of sensor electrodes at a sensing frame rate that is faster than the display frame rate and in a different order than an order with which the display lines are driven by the display driver.

4. The processing system of claim 3, wherein:
   the plurality of columns of sensor electrodes are arranged in a plurality of vertical subdivisions; and
   the sensor module is further configured to drive the plurality of columns of sensor electrodes in an order in which the vertical subdivisions are driven in a staggered order to avoid overlapping active sensor electrodes with active display elements.

5. The processing system of claim 1, wherein the sensor module is further configured to:
   drive the plurality of columns of sensor electrodes in an absolute capacitive sensing mode by sequentially driving different sets of one or more sensor electrodes with an absolute sensing signal, the sensor electrodes being disposed in a matrix array within a common layer.

6. The processing system of claim 1, wherein:
   the sensor module is configured to drive the plurality of columns of sensor electrodes at a sensing frame rate that is equal to a display frame rate at which the display lines are driven by the display driver.

7. The processing system of claim 1, wherein the capacitive routing traces extend from the second edge of the device to connect to the sensor electrode driven by that capacitive routing trace.

8. The processing system of claim 1, wherein the capacitive routing traces extend from the second edge of the display to connect to the sensor electrode driven by that capacitive routing trace.

9. An input device for capacitive sensing, the input device comprising:
   a plurality of columns of sensor electrodes;
   a display including a plurality of display lines of rows of display elements, wherein the sensor electrodes comprise display electrodes of the display configured for updating display pixels of the display and for capacitive sensing; and a processing system, comprising:
  a sensor module configured to:
    drive a first sensor electrode of each of the plurality of columns of sensor electrodes at a first edge of the display with a first sensing signal during a first blanking period before a display frame, and
    starting at a first time period after the first blanking period, drive the other sensor electrodes of the plurality of columns of sensor electrodes with sensing signals from the first edge of the display to a second edge of the display,
    wherein the sensor electrodes are driven by capacitive routing traces, and
    wherein the capacitive routing trace for driving a sensor electrode does not overlap any display line of a row of display elements nearer to the first edge of the display than the sensor electrode; and
  a display driver configured to:
    during a second time period that at least partially overlaps the first time period, drive a first display line at the first edge of the display with a display update signal during the display frame, and
    after the second time period, drive remaining display lines of rows of display elements with display update signals from the first edge of the display to the second edge of the display during the display frame,
    wherein, during the display frame, while driving the plurality of columns of sensor electrodes from the first edge to the second edge of the display, the capacitive routing trace for each sensor electrode, of the plurality of columns of sensor electrodes, while being driven with one of the sensing signals does not overlap the display line of the row of display elements being driven concurrently with one of the display update signals.

10. The input device of claim 9, wherein:
the sensor module is further configured to drive a second sensor electrode of each of the plurality of columns of sensor electrodes with a second sensing signal in a vertical blanking period that occurs after the display frame.

11. The input device of claim 9, wherein:
the sensor module is further configured to drive the plurality of columns of sensor electrodes at a sensing frame rate that is faster than the display frame rate and in a different order than an order with which the display lines are driven by the display driver.

12. The input device of claim 11, wherein:
the plurality of columns of sensor electrodes are arranged in a plurality of vertical subdivisions; and
the sensor module is further configured to drive the plurality of columns of sensor electrodes in an order in which the vertical subdivisions are driven in a staggered order to avoid overlapping active sensor electrodes with active display elements.

13. The input device of claim 9, wherein the sensor module is further configured to:
drive the plurality of columns of sensor electrodes in an absolute capacitive sensing mode by sequentially driving different sets of one or more sensor electrodes with an absolute sensing signal, the sensor electrodes being disposed in a matrix array within a common layer.

14. The input device of claim 9, wherein:
the sensor module is configured to drive the plurality of columns of sensor electrodes at a sensing frame rate that is equal to a display frame rate at which the display lines are driven by the display driver.

15. The input device of claim 9, wherein the capacitive routing traces extend from the second edge of the display to connect to the sensor electrode driven by that capacitive routing trace.

16. A method for capacitive sensing, the method comprising:
driving a first sensor electrode of each of a plurality of columns of sensor electrodes with a first sensing signal during a first blanking period before a display frame, wherein the first sensor electrode comprises a first display electrode at of a first edge of a display, the first display electrode configured for updating display pixels of the display and for capacitive sensing;
starting at a first time period after the first blanking period, driving the other sensor electrodes of the plurality of columns of sensor electrodes with sensing signals from the first edge of the display to a second edge of the display, wherein:
  the sensor electrodes are driven by capacitive routing traces, and
  the capacitive routing trace for driving a sensor electrode does not overlap any display line of a row of display elements nearer to the first edge of the display than the sensor electrode;
during a second time period that at least partially overlaps the first time period, driving a first display line of a row of display elements at the first edge of the display with a display update signal during a display frame,
after the second time period, driving remaining display lines of rows of display elements with display update signals from the first edge of the display to the second edge of the display during the display frame,
wherein, during the display frame, while driving the plurality of columns of sensor electrodes from the first edge to the second edge of the display, the capacitive routing trace for each sensor electrode, of the plurality of columns of sensor electrodes, while being driven with one of the sensing signals does not overlap the display line of the row of display elements being driven concurrently with one of the display update signals.

17. The method of claim 16, further comprising:
driving a second sensor electrode of each of the plurality of columns of sensor electrodes with a second sensing signal during a blanking period that is after the display frame.

18. The method of claim 16, wherein:
the plurality of columns of sensor electrodes are driven at a sensing frame rate that is equal to a display frame rate at which the display lines are driven.

19. The method of claim 16, wherein the capacitive routing traces extend from the second edge of the display to connect to the sensor electrode driven by that capacitive routing trace.

* * * * *

UNITED STATES PATENT AND TRADEMARK OFFICE
CERTIFICATE OF CORRECTION

PATENT NO. : 9,874,973 B2  
APPLICATION NO. : 14/582460  
DATED : January 23, 2018  
INVENTOR(S) : Petr Shepelev It is certified that error appears in the above-identified patent and that said Letters Patent is hereby corrected as shown below:

Column 20 Line 18 in Claim 16, after "at" delete "of".

Signed and Sealed this  
Nineteenth Day of June, 2018

Andrei Iancu  
*Director of the United States Patent and Trademark Office*